(12) United States Patent
Chen et al.

(10) Patent No.: US 8,675,580 B2
(45) Date of Patent: Mar. 18, 2014

(54) METHOD AND APPARATUS FOR FACILITATING PACKET SCHEDULING FOR A HYBRID COMMUNICATION NETWORK

(75) Inventors: Tao Chen, Espoo (FI); Esa Kunnari, Saarenkylä (FI)

(73) Assignee: Broadcom Corporation, Irvine, CA (US)

( * ) Notice: Subject to any disclaimer, the term of this patent is extended or adjusted under 35 U.S.C. 154(b) by 69 days.

(21) Appl. No.: 13/180,033

(22) Filed: Jul. 11, 2011

(65) Prior Publication Data

US 2013/0016666 A1    Jan. 17, 2013

(51) Int. Cl.
*H04W 4/00* (2009.01)

(52) U.S. Cl.
USPC .......................................... 370/329; 370/310

(58) Field of Classification Search
USPC .......... 370/329, 310, 252, 315, 330; 455/423, 455/67.11, 436, 452.2, 456.2, 518, 414.2, 455/16, 501
See application file for complete search history.

(56) References Cited

U.S. PATENT DOCUMENTS

| | | | |
|---|---|---|---|
| 2002/0044527 A1 | 4/2002 | Jiang et al. | |
| 2009/0023460 A1* | 1/2009 | Cho et al. | 455/456.2 |
| 2009/0034447 A1* | 2/2009 | Yu et al. | 370/315 |
| 2010/0093364 A1* | 4/2010 | Ribeiro et al. | 455/452.2 |
| 2010/0261469 A1* | 10/2010 | Ribeiro et al. | 455/423 |
| 2011/0170431 A1* | 7/2011 | Palanki et al. | 370/252 |
| 2012/0028672 A1* | 2/2012 | Chen et al. | 455/522 |

OTHER PUBLICATIONS

Combined Search and Examination Report for Great Britain Application No. 1111854.4 dated Nov. 5, 2011.

* cited by examiner

*Primary Examiner* — Abdullah Riyami
(74) *Attorney, Agent, or Firm* — Alston & Bird LLP

(57) ABSTRACT

Methods, apparatus and computer program products facilitate scheduling in a hybrid communication network with mobile devices of the first type such as device-to-device (D2D) mobile terminals and second type of mobile terminals such as cellular terminals. A scheduling activity factor is calculated based at least in part on a total number of both mobile devices of the first type and second type of mobile terminals, which is sent to at least one first type of mobile terminal. After signal to interference plus noise ratio (SINR) information is received from the at least one first type of mobile terminal after transmission of the scheduling activity factor, the first type of mobile terminal may be scheduled separately from second type of mobile terminals, based at least in part on the SINR information which is utilized to establish a predefined or determined threshold.

23 Claims, 7 Drawing Sheets

METHOD AND APPARATUS FOR FACILITATING PACKET SCHEDULING FOR A HYBRID COMMUNICATION NETWORK

TECHNOLOGICAL FIELD

Embodiments of the present invention relate generally to communications technology and, more particularly, to methods and apparatus for facilitating packet scheduling in a hybrid cellular network which comprises device-to-device (D2D) and other communications such as cellular communications.

BACKGROUND

Cellular systems in the Long Term Evolution (LTE) and LTE-Advanced specifications not only provide for cellular communications as between a mobile terminal and a base station, but also, for communications between mobile terminals. Referred to as device-to-device or "D2D" communications, mobile terminals may communicate with one another utilizing a direct radio link in addition to the cellular communication. While the cellular communications utilize frequency division duplexing (FDD) mode, these D2D communications utilize time division duplexing (TDD) duplex mode with the base station controlling the use of the uplink (UL) and downlink (DL) resources of the cellular network. The end result of providing for such D2D communications is reduced transmitter power consumption for both the base station and the mobile terminals, increased cellular network capacity and improved services for the users, and thus, D2D communications are expected to become very popular as the demands on our wireless communications networks increase faster than the capacity of these networks.

Packet scheduling mechanisms for wireless networks providing such a "hybrid" environment may be quite challenging for a number of reasons. Traditional cellular systems with only cellular devices in the network typically utilize a "proportional fair" or "PF" packet scheduler. The PF metric to assign mobile terminals in a PF packet scheduler is based on the ratio of the instant signal to interference plus noise ratio (SINR) based criteria and throughput based criteria. Thus, the PF metric can be expressed as the following equation, wherein j is the jth transmission time interval (TTI)/the current TTI:

PFmetric($j$)=InstSINR($j$)/AvgSINR

While providing a fair comparison for all cellular devices, using techniques such as the PF scheduler to divide and scheduling resources in such a hybrid network poses several difficulties. Because of dynamic channel conditions in D2D connections and also, associated levels of interference, mobile terminals in a D2D connection will have a higher PF metric. In this regard, the PF metric distribution for mobile terminals with a D2D connection may be much wider because of more dynamic changes in the channel conditions and the interference, mainly from the cellular users. As a mobile terminal with a D2D connection may experience severe interference from the neighboring cellular and D2D transmissions at some TTIs, the average SINR decreases greatly. Consequently, during the other TTIs in which the mobile terminals with a D2D connection experiences less interference, the PF metric will generally be fairly high in comparison with cellular users. Thus, utilizing the PF metric in hybrid network will usually result in choosing the D2D users over cellular users, and thus, packets from D2D mobile terminals may be overscheduled.

BRIEF SUMMARY

Therefore, methods, apparatus and computer program products are provided according to an example embodiment for facilitating scheduling of packets in a hybrid cellular and non-cellular environment. The various example embodiments perform PF scheduling in a manner that more uniformly considers the division and scheduling of resources for both cellular and D2D devices such that packets from mobile terminals of the first type, such as D2D devices, are not overscheduled relative to a second type of mobile terminals, such as cellular or other devices.

According to one example embodiment, a method for use in controlling packet scheduling in a hybrid communication network, the hybrid network comprising at least one first type of mobile terminal and at least one second type of mobile terminal, wherein the first type of mobile terminal is a D2D mobile terminal and the second type of mobile terminal is different than said first type of mobile terminal, comprises: calculating a scheduling activity factor based at least in part on a total number of both mobile devices of the first type and second type of mobile terminals; causing a scheduling activity factor to be sent at least one first type of mobile terminal; receiving signal to interference plus noise ratio (SINR) information, scheduling resources for use by the at least one mobile terminal of the first type separately from resources for use by the or each mobile terminal of the second type based at least in part on the received SINR information; and on the basis of said resources scheduled for the at least one mobile terminal of the first type, causing scheduling information to be sent to the at least one mobile terminal of the first type.

In this example embodiment, the method may also include generating a D2D SINR distribution based at least in part on previous SINR measurements within a particular time window. The scheduling may comprise scheduling the resources based at least in part on a channel quality indicator (CQI) for the mobile terminals of the first type separate from the mobile terminals of the second type. In one embodiment, causing a scheduling activity factor to be sent may comprise causing a scheduling activity factor to be communicated to the first type of mobile terminal by cellular signaling. Causing the scheduling activity factor to be communicated may comprise causing the scheduling activity factor to be communicated to the first type of mobile terminal by a device-to-device connection. In one embodiment, calculating may comprise dividing a number of mobile terminals of the first type by the total number of mobile devices of the first type and second type of mobile terminals. In this and other example embodiments, the second type of mobile terminals may comprise cellular terminals.

In another example embodiment, a method for use in controlling packet scheduling in a hybrid communication network, the hybrid network comprising at least one first type of mobile terminal and at least one second type of mobile terminal, wherein the first type of mobile terminal is a D2D mobile terminal and the second type of mobile terminal is different than said first type of mobile terminal, comprises: receiving a scheduling activity factor, the scheduling activity factor being based at least in part on a total number of mobile devices of the first type and second type of mobile terminals; determining a threshold signal to interference plus noise ratio (SINR) value based at least in part on the scheduling activity factor by referencing a SINR distribution; assessing a measured SINR value for the first type of mobile terminal; and, causing data indicative of the SINR to be transmitted in an instance in which the SINR value exceeds the threshold SINR value. The SINR distribution which may comprise a SINR distribution curve is based at least in part on SINR measurement over a particular window of time.

In one embodiment, the method may further include receiving a scheduling activity factor by cellular signaling and/or receiving scheduling information from a base station. In this and other embodiments, the second type of mobile terminals comprises cellular terminals.

In an example embodiment, an apparatus for controlling packet scheduling in a hybrid communication network, the hybrid network comprising at least one first type of mobile terminal and at least one second type of mobile terminal, wherein the first type of mobile terminal is a D2D mobile terminal and the second type of mobile terminal is different than the first type of mobile terminal, comprises: at least one processor; and at least one memory including computer program code, the at least one memory and the computer program code configured to, with the at least one processor, cause the apparatus at least to: calculate at a base station a scheduling activity factor based at least in part on a total number of both mobile devices of the first type and second type of mobile terminals; cause a scheduling activity factor to be sent at least one first type of mobile terminal; receive signal to interference plus noise ratio (SINR) information, schedule resources for use by the at least one mobile terminal of the first type separately from resources for use by each mobile terminal of the second type based at least in part on the received SINR information; and on the basis of said resources scheduled for the at least one mobile terminal of the first type, cause scheduling information to be sent to the at least one mobile terminal of the first type.

In this example embodiment, the least one memory and the computer program code are configured to, with the at least one processor, may further cause the apparatus to generate a D2D SINR distribution based at least in part on previous SINR measurements within a particular time window, schedule the resources based at least in part on a channel quality indicator (CQI) for the mobile terminals of the first type separate from the mobile terminals of the second type, cause the schedule activity factor to be communicated to the first type of mobile terminal by cellular signaling, and/or cause the scheduling activity factor to be sent to the first type of mobile terminal via a device-to-device connection. The at least one memory and the computer program code may be further configured to, with the at least one processor, cause the apparatus to grant resources to the at least one mobile terminal of the second type and the at least one mobile terminal of the first type for transmission based at least in part on the scheduling decision, divide a number of mobile terminals of the first type by the total number of mobile devices of the first type and second type of mobile terminals, and/or generate a D2D SINR distribution.

In an example embodiment, an apparatus for controlling packet scheduling in a hybrid communication network, the hybrid network comprising at least one first type of mobile terminal and at least one second type of mobile terminal, wherein the first type of mobile terminal is a D2D mobile terminal and the second type of mobile terminal is different than said first type of mobile terminal, comprises at least one processor and at least one memory including computer program code, the at least one memory and the computer program code configured to, with the at least one processor, cause the apparatus at least to: receive a scheduling activity factor based at least in part on a total number of mobile devices of the first type and second type of mobile terminals; determine a threshold signal to interference plus noise ratio (SINR) value based at least in part on the scheduling activity factor by referencing a SINR distribution; assess a measured SINR value for the first type of mobile terminal; and, cause data indicative of the SINR to be transmitted in an instance in which the SINR value exceeds the threshold SINR value.

In this example embodiment, the at least one memory and the computer program code may be configured to, with the at least one processor, cause the apparatus to reference a SINR distribution which is based at least in part on SINR measurement over a particular window of time, receive a scheduling activity factor by cellular signaling, and/or receive scheduling information from a base station.

In another example embodiment, a computer program product is provided which includes a non-volatile computer readable storage medium storing computer readable instructions for calculating a scheduling activity factor based at least in part on a total number of both mobile devices of the first type and second type of mobile terminals; causing a scheduling activity factor to be sent at least one first type of mobile terminal; receiving signal to interference plus noise ratio (SINR) information, schedule resources for use by the at least one mobile terminal of the first type separately from resources for use by each mobile terminal of the second type based at least in part on the received SINR information; and on the basis of said resources scheduled for the at least one mobile terminal of the first type, cause scheduling information to be sent to the at least one mobile terminal of the first type.

In another example embodiment, a computer program product is provided which includes a non-volatile computer readable storage medium storing computer readable instructions for receiving a scheduling activity factor based at least in part on a total number of mobile devices of the first type and second type of mobile terminals; determining a threshold SINR value based at least in part on the scheduling activity factor by referencing a SINR distribution, which may comprise a SINR distribution curve; assessing a SINR value for the first type of mobile terminal; and/or, causing data indicative of the SINR to be transmitted in an instance in which the SINR value exceeds a predefined or determined threshold.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWINGS

Figure 1:
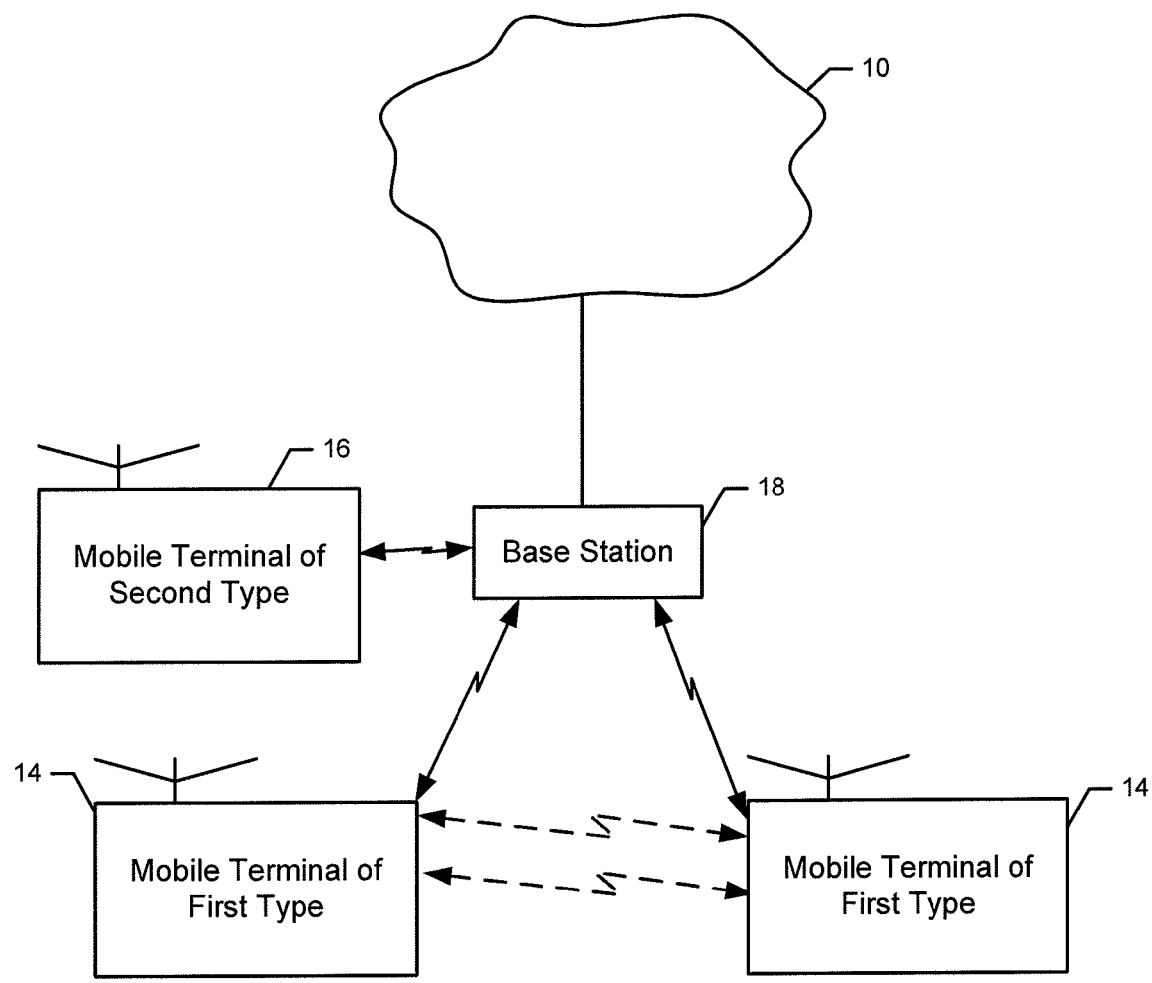

Having thus described example embodiments of the invention in general terms, reference will now be made to the accompanying drawings, which are not necessarily drawn to scale, and wherein:

FIG. 1 illustrates a system including mobile terminals and a base station configured to support communications in accordance with one embodiment of the present invention.

Figure 2:
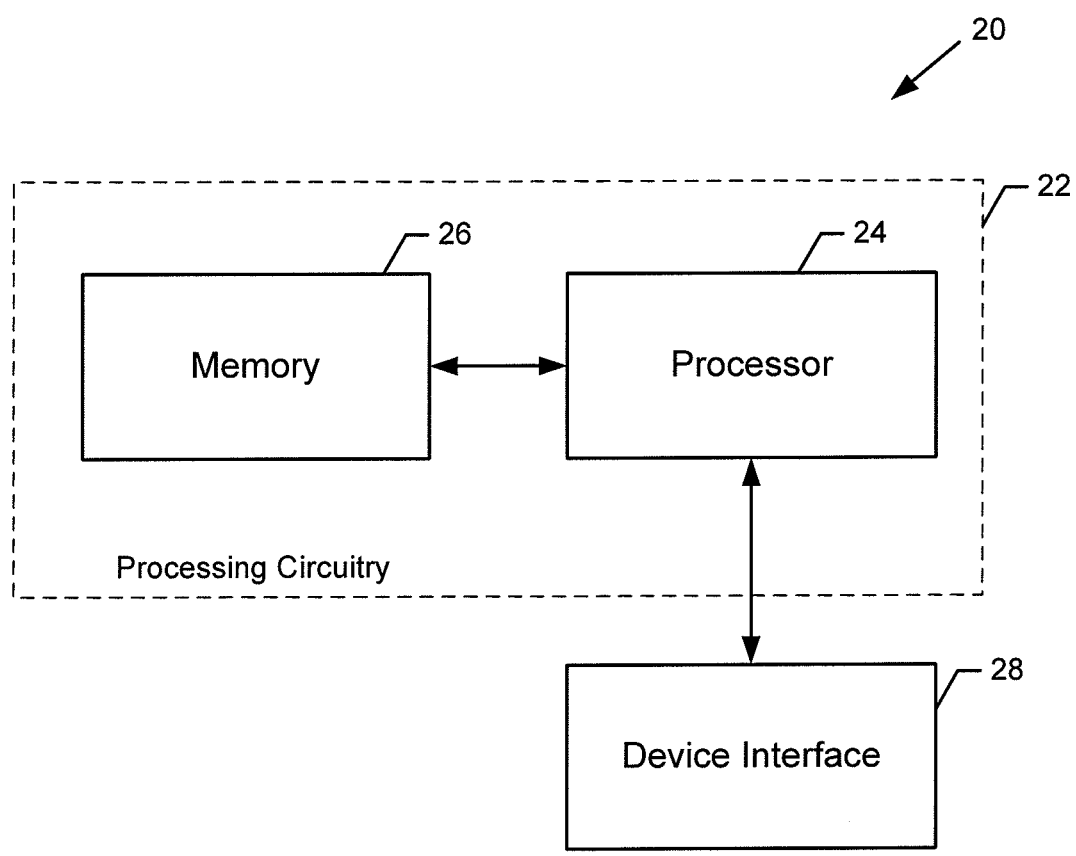

FIG. 2 is a block diagram of a mobile terminal in accordance with one embodiment of the present invention, wherein the mobile terminal may comprise a first type of mobile terminal or another non-D2D terminal such as a cellular terminal.

Figure 3:
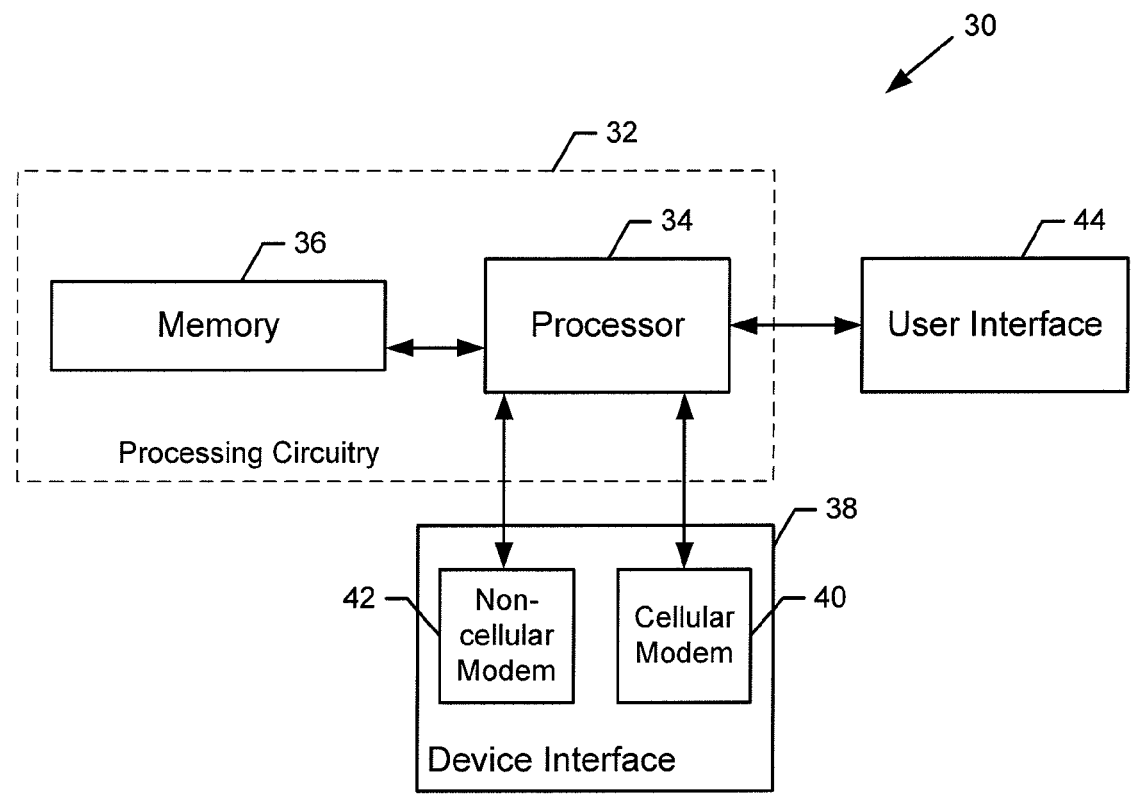

FIG. 3 is a block diagram of a base station or other network element in accordance with one embodiment of the present invention.

Figure 4:
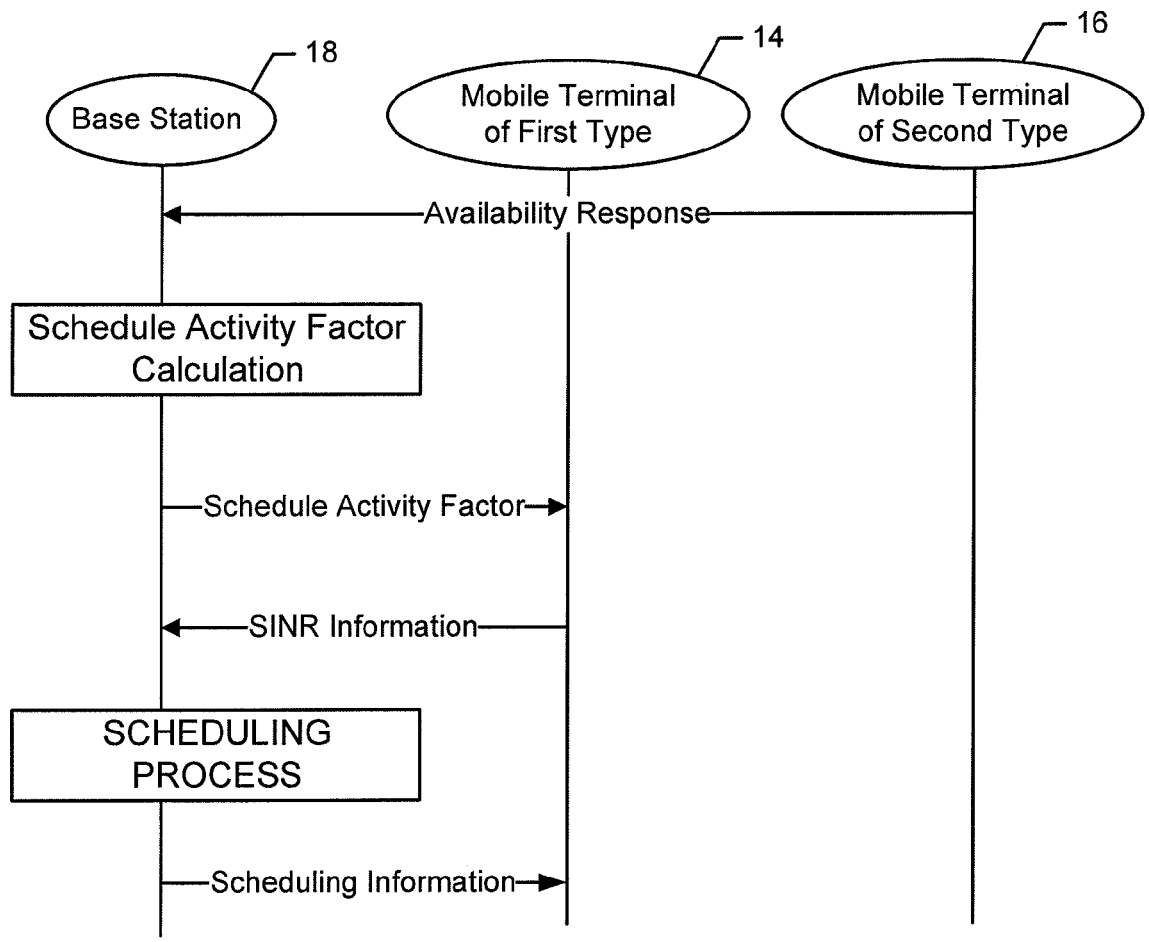

FIG. 4 is a signaling diagram illustrating messages exchanged between the base station, D2D terminal, and mobile terminal of the second type in accordance with an example embodiment of the present invention.

Figure 5:
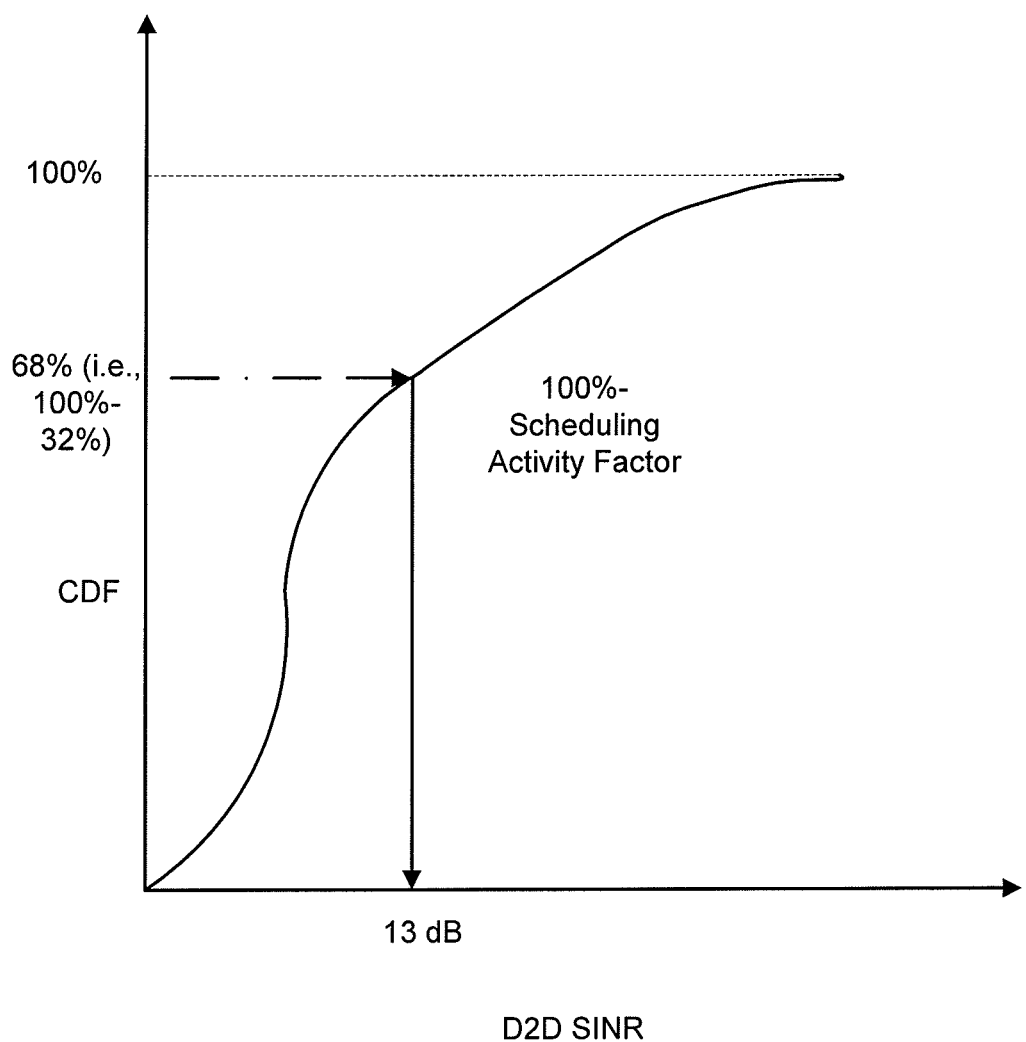

FIG. 5 is a flow chart illustrating the operations performed from the perspective of a base station in accordance with one embodiment of the current invention.

Figure 6:
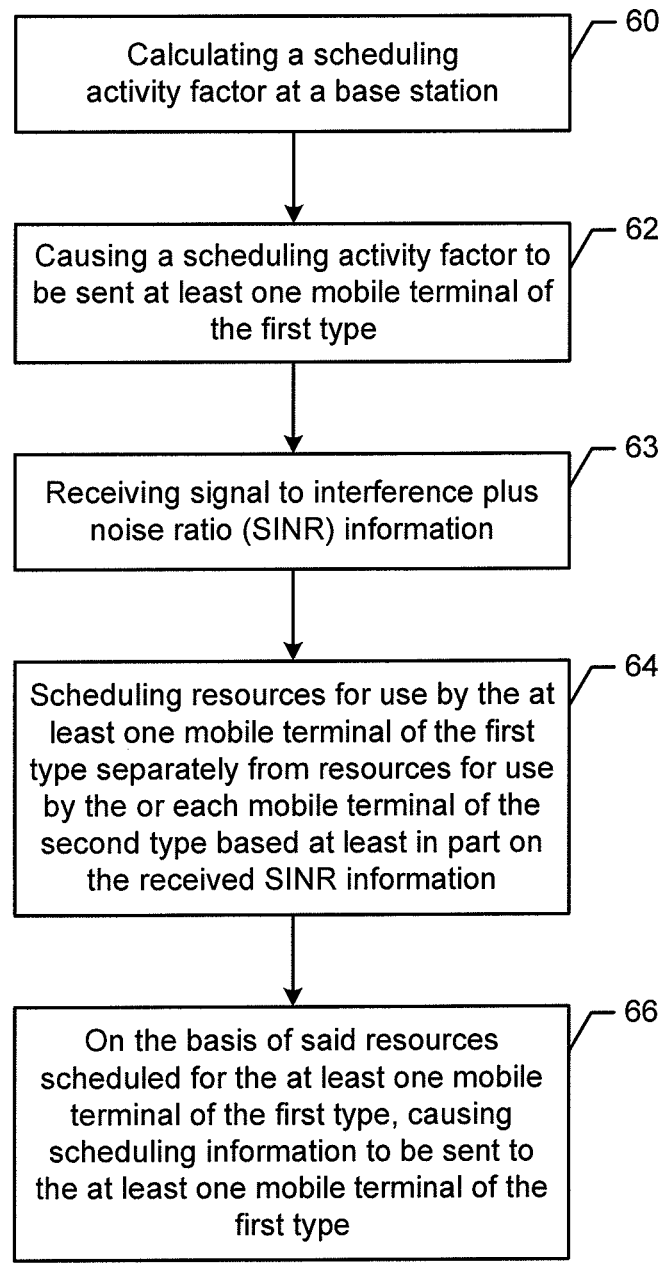

FIG. 6 is a flow chart illustrating the operations performed from the perspective of a base station in accordance with one embodiment of the current invention.

Figure 7:
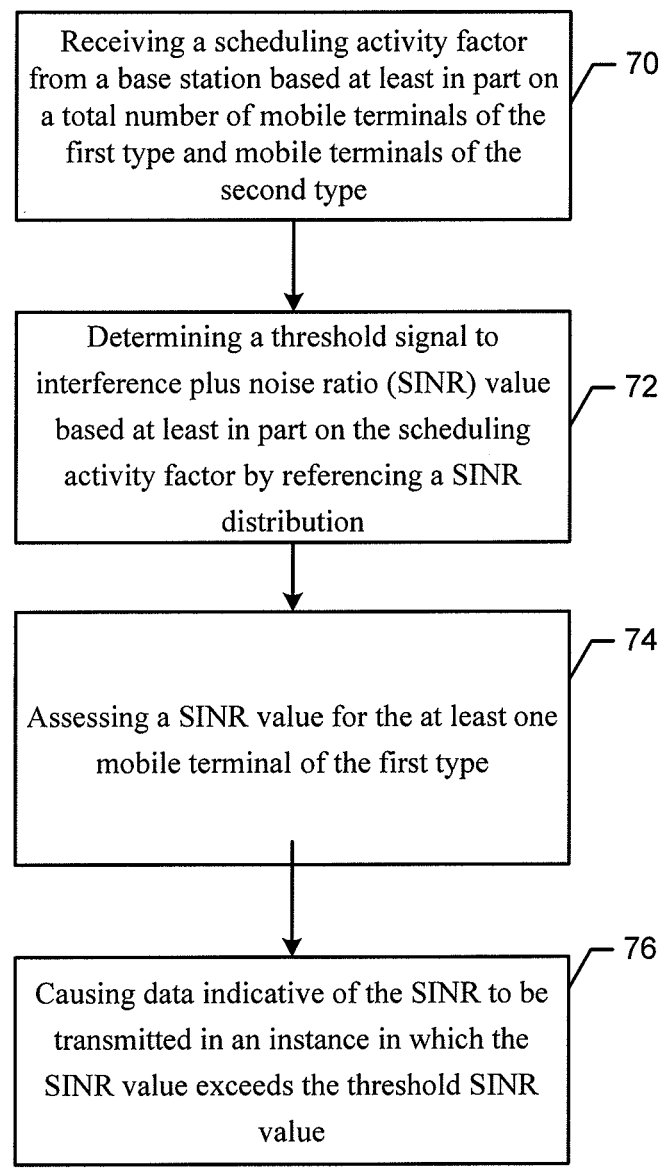

FIG. 7 is a flow chart illustrating the operations performed from the perspective of a D2D terminal in accordance with one embodiment of the current invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In some example embodiments, mobile terminals 14 or 16 may be a mobile communication device such as, for example, a mobile telephone, portable digital assistant (PDA), pager, laptop computer, or any of numerous other hand held or portable communication devices, computation devices, content generation devices, content consumption devices, or combinations thereof.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

A method, apparatus and computer program product are disclosed for facilitating scheduling in a hybrid communication network. In this regard, the method, apparatus and computer program product of some example embodiments perform PF scheduling in a manner that more uniformly considers the division and scheduling of resources for both cellular and D2D terminals such that packets from mobile terminals of the first type are not overscheduled relative to cellular or second type of mobile terminals. Although the method, apparatus and computer program product may be implemented in a variety of different systems, one example of such a system is shown in FIG. 1, which includes communication devices (e.g., mobile terminals 14 and 16) that are capable of communication with a network 10 (e.g., a core network) via a base station 18 (e.g., a Node B, an evolved Node B (eNB) or another type of access point). While the network 10 may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 10 may include a collection of various different nodes, devices or functions that may be in communication with each other via corresponding wired and/or wireless interfaces. For example, the network 10 may include one or more base stations 18, each of which may serve a coverage area divided into one or more cells. The base stations could be, for example, part of one or more cellular or mobile networks or public land mobile networks (PLMNs). In turn, other devices such as processing devices (e.g., personal computers, server computers or the like) may be coupled to the mobile terminals via the network.

A communication device, such as the mobile terminals 14 and 16 (also known as user equipment (UE)), may be in communication with other communication devices or other devices via the base station 18 and, in turn, the network 10. The mobile terminals 14 or 16 may comprise any device, but for purposes of illustration, mobile terminals 14 are considered a first type of mobile terminal that are configured to communicate via a D2D connection, and mobile terminals 16 are considered a second type of "other" mobile terminal, that is, a non-D2D terminal or a least a mobile terminal that is communicating via a connection other than a D2D connection, such as, for example, a cellular mobile terminal. In some cases, the mobile terminals 14 and 16 may include an antenna for transmitting signals to and for receiving signals from the base station 18.

In some example embodiments, mobile terminals 14 or 16 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminals 14 and 16 may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminals 14 and 16 may also include communication circuitry and corresponding hardware/software to enable communication with other devices and/or the network 10. While only two D2D terminals 14 and a single other, e.g., cellular, terminal 16 are illustrated in FIG. 1, more mobile terminals may be included within network 10 and/or having a communication link with base station 18.

In one embodiment, for example, the mobile terminals 14 or 16 may be embodied as or otherwise include an apparatus 20 as generically represented by the block diagram of FIG. 2. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminals 14 and 16, the processing circuitry may be embodied as a portion of a mobile computing device or mobile device of the second type, and may provide for D2D communications in the context of a D2D terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 10 and/or any other device or module in communication with the processing circuitry 22. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The apparatus 20 may comprise, in the case of mobile terminal 14, a first type of mobile terminal that is configured to communicate in accordance via a D2D connection. Apparatus 20 may also comprise, in the case of mobile terminal 16, a mobile terminal configured to communicate other than by D2D connections and, as such may be a cellular mobile terminal including, without limitation, a Smartphone. However, mobile terminal 16 may, in other example embodiments, be a hybrid terminal that is configured to communicate in accordance with both a D2D connection and another connection, such as a cellular connection.

As noted above, a base station 18 may be configured to communicate with the mobile terminals 14, 16. In some cases, the base station 18 may include an antenna or an array of antennas for transmitting signals to and for receiving signals from the mobile terminals. The base station 18 may include one or more processors that may define processing circuitry either alone or in combination with one or more memories. The processing circuitry may utilize instructions stored in the memory to cause the base station to operate in a particular way or execute specific functionality when the instructions are executed by the one or more processors. The base station 18 may also include communication circuitry and corresponding hardware/software to enable communication with the mobile terminals and/or the network 12.

In one embodiment, the base station may be embodied as or otherwise include an apparatus 30 as generically represented by the block diagram of FIG. 3. While the apparatus may be employed, for example, by a base station, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 30 may include or otherwise be in communication with processing circuitry 32 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38. As such, the processing circuitry may be embodied as a circuit chip (e.g., an integrated circuit chip) configured (e.g., with hardware, software or a combination of hardware and software) to perform operations described herein. However, in some embodiments taken in the context of the base station, the processing circuitry may be embodied as a portion of a base station or other network entity.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 12 and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In the illustrated embodiment, for example, the device interface includes a cellular modem 40 for supporting communications in the licensed spectrum, such as communications with the base station 18, and a non-cellular modem 42 for supporting communications in the license exempt band, such as non-cellular communications, e.g., communications in the ISM band or the TVWS band, with second type of mobile terminals.

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

FIG. 4 is a signaling diagram illustrating messages exchanged between the base station 18, a D2D terminal 14, and a mobile terminal of the second type 16 in accordance with an example embodiment of the present invention. While FIG. 4 illustrates the messages being exchanged between a base station 18, D2D terminal 14, and a mobile terminal of the second type 16, these messages are shown for example purposes only. Thus, any device within a communications network 10 may be utilized in place of the base station 18, D2D terminal 14, and mobile terminal of the second type 16. The mobile terminal of the second type 16 may comprise any type of device that is communicating with the base station 18 via a connection other than a D2D connection, such as a cellular connection. Indeed, the second type of mobile terminal 16 may be a hybrid terminal that is also capable of D2D communications, but is considered an second type of mobile terminal in an instance in which the second type of mobile terminal is relying on a connection, other than a D2D connection, to communicate with the base station 18 and, in turn, with the network 10.

In accordance with an embodiment of the present invention, the first type of mobile terminal 14 and the mobile terminal of the second type 16 may send an availability response to the base station 18. This availability response may comprise, without limitation, a response to a ping or request from the base station 18. However, an availability response may not be requested or triggered by the base station 18 and the D2D terminals and the second type of mobile terminals may not need to send an availability response to the base station 18 if the base station 18 has another mechanism for determining the number of mobile devices of the first type 14 and second type of mobile terminals 16 which are connected to the base station 18. A connection to the base station 18 may comprise any type of communication connection, either wired or wireless, and may exist in a cellular or non-cellular band.

Once the base station 18 has determined, either by receipt of availability responses or by another mechanism, the number of mobile devices of the first type 14 and second type of mobile terminals 16 which are connected to the base station 18, the base station 18 calculates a scheduling activity factor. This calculation may be defined by any type of mathematical equation or formula which has the effect of placing a limit on, or reducing, the SINR value reported by the first type of mobile terminal 14. In one example embodiment, this calculation involves determining the number of mobile terminals of the first type 14 as a percentage of the total number of mobile devices of the first type 14 and second type of mobile terminals 16 connected to the base station 18. For example, in an instance in which 32 mobile terminals of the first type and 68 mobile terminals of the second type are connected to the base station, the calculated activity factor is 32/(68+32)=32%. It is to be noted that the determined SINR should be evaluated against the SINR cumulative distribution function (CDF) distribution (at the point of 100%−32%=68%); as a result, the SINR be reported by the mobile terminal for scheduling when the SINR for a given mobile terminal 14 is within the top 32%.

Once the base station 18 has calculated the schedule activity factor, the base station sends the schedule activity factor to the first type of mobile terminal 14. This transmission from the base station 18 may occur over any communication protocol, including without limitation, via a signaling protocol such as cellular signaling or GPS signaling.

A SINR distribution may comprise a SINR distribution curve, and is received or generated either by the base station 18, by the first type of mobile terminal 14, by the second type of mobile terminal 16, or by an external device. This SINR distribution curve is stored in a memory which is accessible to the base station 18, the first type of mobile terminal 14, or the second type of mobile terminal 16, and can be stored in any type of programming language or sequence of commands. The SINR distribution curve may be generated by analyzing historical SINR information for the first type of mobile terminal 14. SINR can be sampled every TTI. The samples within a period can be stored to shape the SINR distribution curve. The SNIR distribution curve can be updated based on a time sliding window period, which can include the latest samples and remove the obsolete samples.

An example of a SINR distribution curve, or a SINR cumulative distribution function (CDF), is provided in FIG. 5, which provides D2D SINR value on the horizontal axis, and the scheduling activity factor on the vertical axis, for a certain window of time. A D2D device 14, operating in accordance with one of the example embodiments of the present invention, would reference the SINR distribution curve to determine the SINR value by location of the position on the curve which corresponds to the value (i.e., 100%−the scheduling activity factor) on the vertical axis, and then, determining the location on the horizontal axis that corresponds to that location to determine the SINR value. As shown for example purposes only, the SINR distribution curve shows a 13 dB SINR value for a first type of mobile terminal with a 32% scheduling activity factor.

Once the SINR value is determined, the D2D mobile terminal 14 uses the SINR value from the SINR distribution curve as a threshold SINR value. Then, when the D2D terminal calculates a measured SINR value, the D2D mobile terminal 14 compares the measured SINR value to the threshold SINR value. The D2D terminal may only report the SINR value to the base station for scheduling considerations if the measured SINR value exceeds the threshold SINR value. The scheduling considerations may comprise calculations utilizing any packet scheduling calculation, including the PF scheduling metric.

Referring now to FIGS. 6 and 7, flowcharts illustrating the operations performed by a method, apparatus and computer program product, such as apparatus 20 of FIG. 2 and apparatus 30 of FIG. 3, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus.

As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s).

The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 6 and 7, when executed, convert a computer or processing circuitry into a particular machine configured to perform an example embodiment of the present invention. Accordingly, the operations of each of FIGS. 6 and 7 define an algorithm for configuring a computer or processing circuitry, e.g., processor 34 in regards to the operations of FIG. 6 and processor 24 in regards to the operations of FIG. 7, to perform an example embodiment. In some cases, a general purpose computer may be provided with an instance of the processor which performs the algorithm of a respective one of FIGS. 6 and 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 6 is a flow chart illustrating the operations performed from the perspective of a base station in accordance with one embodiment of the current invention. To provide optimized scheduling in accordance with an embodiment of the present invention, the base station 18 and, more generally, apparatus 30 may include means, such as the processing circuitry 32, the processor 34 or the like, for calculating the scheduling activity factor based at least in part on a total number of both mobile devices of the first type and second type of mobile terminals. See block 60. For example, as discussed for FIG. 5, the scheduling activity factor may be calculated by dividing the number of mobile terminals of the first type by the total number of mobile devices of the first type and second type of mobile terminals, then multiplying the result by 100% to obtain the percentage which comprises the scheduling activity factor.

Once the base station 18 has calculated the scheduling activity factor, the apparatus 30 may include means, such as the processing circuitry 32, the processor 34, the device interface 38 or the like for causing the scheduling activity factor to be sent to at least one first type of mobile terminals. See block 62. The apparatus 30 may also include means, such as the processing circuitry 32, the processor 34, the device interface 38 or the like, for receiving SINR information, as shown in block 63. After the first type of mobile terminal receives the scheduling activity factor, the apparatus 30 may include means, such as the processing circuitry 32, the processor 34, the device interface 38 or the like, for scheduling resources for use by the at least one mobile terminal of the first type separately from resources for use by the or each mobile terminal of the second type based at least in part on the received SINR information. See block 64. This scheduling of resources may occur after the first type of mobile terminal 14 references the SINR distribution curve to determine the SINR threshold level which corresponds to the scheduling activity factor. Thus, the first type of mobile terminal 14 only reports SINR information to the base station 18 if the measured SINR exceeds the derived threshold SINR level.

The base station 18 may also take into account other measures of the quality of the respective communication channels in addition to the SINR in the scheduling of resources for the first and second types of mobile terminals. In this regard, the scheduling of resources may also involve the base station 18 maintaining a channel quality indicator (CQI) for the mobile terminals 14 of the first type separate from the mobile terminals 16 of the second type. CQI may comprise any information which describes the quality of a communication channel, or any information which relates to the characteristics of a communication channel. The CQI may be based upon any one or more of various performance metrics including, for example, the SINR. In this regard, the first and second types of mobile terminals may report the CQI to the base station which may, in turn, take the CQI for the first and second types of mobile terminals into account along with the SINR information in scheduling resources for use by the various types of terminals.

Once the base station 18 has received the SINR information, which would occur when the first type of mobile terminal's measured SINR has exceeded the threshold SINR, the apparatus 30 may include means, such as the processing circuitry 32, the processor 34 or the like, for causing scheduling information to be sent to the at least one mobile terminal of the first type on the basis of resources scheduled for the at least one mobile terminal of the first type. See block 66. This scheduling information may comprise any type of information relating to scheduling priority, data types, or data sizes.

FIG. 7 is a flow chart illustrating the operations performed from the perspective of a first type of mobile terminal 14 in accordance with one embodiment of the current invention. To provide optimized scheduling, the first type of mobile terminal 14 and, more generally, the apparatus 20 includes means, such as the processing circuitry 32, processor 34, device interface 38 or the like, for receiving a scheduling activity factor based at least in part on a total number of mobile devices of the first type and second type of mobile terminals. See block 70. The scheduling activity factor may be communicated from the base station 18 to the first type of mobile terminal 14 via any signaling protocol, including without limitation, cellular signaling or GPS signaling.

As discussed in FIGS. 4 and 6, the scheduling activity factor may be calculated in any manner which returns a value representing the ratio of mobile terminals of the first type to the total number of devices in the communication network. For example, the scheduling activity factor may be calculated by dividing the number of mobile terminals of the first type by the total number of devices (mobile terminals of the first type and mobile terminals of the second type) in the communication network 10, and then, multiplying this result by 100% to arrive at a percentage which represents the scheduling activity factor.

Once the base station 18 calculates the scheduling activity factor, the first type of mobile terminal 14, such as the apparatus 20 includes means, such as the processing circuitry 22, the processor 24 or the like, for determining a threshold SINR value based at least in part on the scheduling activity factor by referencing a SINR distribution. See block 72. The SINR distribution may comprise a SINR distribution curve generated by the base station 18, the first type of mobile terminal 14, or the second type of mobile terminal 16, or may be created by an entity outside of the communication network 10 and stored in a memory device which may be accessed by the first type of mobile terminal 14. The first type of mobile terminal may determine a threshold SINR value by finding the first location on the SINR distribution curve that corresponds with the value (i.e., 100%–the scheduling activity factor) on the vertical axis, and then, determining the location on the horizontal axis that corresponds with the first location to determine the threshold SINR value.

Once the first type of mobile terminal 14 determines the threshold SINR value, the apparatus 20 may include means, such as the processing circuitry 22, the processor 24 or the like, for assessing, e.g., determining, a measured (or actual) SINR value by performing an internal measurement process. See block 74. In another example embodiment, another device or an external device may calculate the measured SINR value for the first type of mobile terminal. This SINR value comprises the measured SINR for the first type of mobile terminal 14.

Once the first type of mobile terminal 18 determines the SINR value, and its threshold value, the apparatus 20 may include means, such as the processing circuitry 22, the processor 24 or the like, for causing data indicative of the SINR to be transmitted in an instance in which the SINR value exceeds the threshold SINR value. See block 76. If the SINR measured value does not exceed the threshold SINR value, then the first type of mobile terminal 14 does not transmit the SINR to the base station 18 as to avoid interference with scheduling calculations. If the SINR measured value does exceed the threshold SINR value, then the first type of mobile terminal does transmit the SINR to the base station 18, and the SINR value is utilized by the base station in the scheduling calculations, which may comprise without limitation, PF scheduling calculations. In addition, the transmitted SINR would be also used for base station controlled D2D link adaptation.

The various embodiments of the present invention present many advantages over the prior art. For example, in a hybrid communications network including D2D and other types of mobile terminals such as cellular terminals, packet scheduling will not always favor the D2D terminal, which will result in fairer and more equalized packet scheduling between mobile devices of the first type and second type of mobile terminals. Thus, the various example embodiments perform PF scheduling in a manner that more uniformly considers the division and scheduling of resources for both cellular and D2D terminals such that packets from mobile terminals of the first type are not overscheduled relative to cellular or other types of mobile terminals.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for use in controlling packet scheduling in a hybrid communication network, the hybrid network comprising at least one first type of mobile terminal and at least one second type of mobile terminal, wherein the first type of mobile terminal is a device-to-device (D2D) mobile terminal and the second type of mobile terminal is different than said first type of mobile terminal, the method comprising:
   calculating a scheduling activity factor based at least in part on a total number of mobile devices of both the first type and second type of mobile terminals;
   causing a scheduling activity factor to be sent to the at least one first type of mobile terminal;
   receiving signal to interference plus noise ratio (SINR) information based at least in part on the scheduling activity factor with reference to an SINR distribution;
   scheduling resources for use by the at least one mobile terminal of the first type separately from resources for use by each mobile terminal of the second type based at least in part on the received SINR information; and
   on the basis of said resources scheduled for the at least one mobile terminal of the first type, causing scheduling information to be sent to the at least one mobile terminal of the first type.

2. The method of claim 1, further comprising generating a D2D SINR distribution based at least in part on previous SINR measurements within a particular time window.

3. The method of claim 1, wherein scheduling comprises scheduling said resources based at least in part on a channel quality indicator (CQI) for the mobile terminals of the first type separate from the second type of mobile terminals.

4. The method of claim 1, wherein causing the scheduling activity factor to be sent comprises causing the scheduling activity factor to be communicated to the first type of mobile terminal by cellular signaling.

5. The method of claim 1, wherein causing the scheduling activity factor to be communicated comprises causing the scheduling activity factor to be communicated to the first type of mobile terminal by a device-to-device connection.

6. The method of claim 1, wherein calculating comprises dividing a number of mobile terminals of the first type by the total number of mobile devices of the first type and the second type of mobile terminals.

7. The method of claim 1, wherein the second type of mobile terminals comprise cellular terminals.

8. A method for use in controlling packet scheduling in a hybrid communication network, the hybrid network comprising at least one first type of mobile terminal and at least one second type of mobile terminal, wherein the first type of mobile terminal is a device-to-device (D2D) mobile terminal and the second type of mobile terminal is different than said first type of mobile terminal, the method comprising:
   receiving a scheduling activity factor, the scheduling activity factor being based at least in part on a total number of mobile devices of the first type and second type of mobile terminals;
   determining a threshold signal to interference plus noise ratio (SINR) value based at least in part on the scheduling activity factor by referencing a SINR distribution;
   assessing a measured SINR value for the first type of mobile terminal; and,
   causing data indicative of the SINR to be transmitted in an instance in which the SINR value exceeds the threshold SINR value.

9. The method of claim 8, wherein the SINR distribution is based at least in part on SINR measurement over a particular window of time.

10. The method of claim 8, wherein receiving comprises receiving the scheduling activity factor by cellular signaling.

11. The method of claim 8, further comprising receiving scheduling information from a base station.

12. The method of claim 8, wherein the second type of mobile terminals comprise cellular terminals.

13. An apparatus for controlling packet scheduling in a hybrid communication network, the hybrid network comprising at least one first type of mobile terminal and at least one second type of mobile terminal, wherein the first type of mobile terminal is a device-to-device (D2D) mobile terminal and the second type of mobile terminal is different than said first type of mobile terminal, the apparatus comprising:
   at least one processor; and
   at least one memory including computer program code, the at least one memory and the computer program code configured to, with the at least one processor, cause the apparatus at least to:
      calculate at a base station a device-to-device (D2D) scheduling activity factor based at least in part on a total number of both mobile devices of the first type and second type of mobile terminals;
      cause a scheduling activity factor to be sent to the at least one first type of mobile terminal;
      receive signal to interference plus noise ratio (SINR) information based at least in part on the scheduling activity factor with reference to an SINR distribution;
      schedule resources for use by the at least one mobile terminal of the first type separately from resources for use by each mobile terminal of the second type based at least in part on the received SINR information; and
      on the basis of said resources scheduled for the at least one mobile terminal of the first type, cause scheduling information to be sent to the at least one mobile terminal of the first type.

14. The apparatus of claim 13, wherein the at least one memory and the computer program code are configured to, with the at least one processor, cause the apparatus to generate a D2D SINR distribution based at least in part on previous SINR measurements within a particular time window.

15. The apparatus of claim 13, wherein the at least one memory and the computer program code are configured to, with the at least one processor, cause the apparatus to schedule said resources based at least in part on a channel quality indicator (CQI) for the first type of mobile terminals separate from the second type of mobile terminals.

16. The apparatus of claim 13, wherein the at least one memory and the computer program code are configured to, with the at least one processor, cause the apparatus to cause the schedule activity factor to be communicated to the first type of mobile terminal by cellular signaling.

17. The apparatus of claim 13, wherein the at least one memory and the computer program code are configured to, with the at least one processor, cause the apparatus to send the scheduling activity factor to the first type of mobile terminal via a device-to-device connection.

18. The apparatus of claim 13, wherein the at least one memory and the computer program code are configured to, with the at least one processor, cause the apparatus to divide a number of mobile terminals of the first type by the total number of mobile devices of the first type and second type of mobile terminals.

19. The apparatus of claim 13, wherein the at least one memory and the computer program code are configured to, with the at least one processor, cause the apparatus to generate a D2D SINR distribution.

20. An apparatus for controlling packet scheduling in a hybrid communication network, the hybrid network comprising at least one first type of mobile terminal and at least one second type of mobile terminal, wherein the first type of mobile terminal is a device-to-device (D2D) mobile terminal and the second type of mobile terminal is different than said first type of mobile terminal, the apparatus comprising:
  at least one processor; and
  at least one memory including computer program code, the at least one memory and the computer program code configured to, with the at least one processor, cause the apparatus at least to:
    receive a scheduling activity factor based at least in part on a total number of mobile devices of the first type and second type of mobile terminals;
    determine a threshold signal to interference plus noise ratio (SINR) value based at least in part on the scheduling activity factor by referencing a SINR distribution;
    assess a measured SINR value for the first type of mobile terminal; and,
    cause data indicative of the SINR to be transmitted in an instance in which the SINR value exceeds the threshold SINR value.

21. The apparatus of claim 20, wherein the at least one memory and the computer program code are configured to, with the at least one processor, cause the apparatus to reference the SINR distribution which is based at least in part on SINR measurement over a particular window of time.

22. The apparatus of claim 20, wherein the at least one memory and the computer program code are configured to, with the at least one processor, cause the apparatus to receive the scheduling activity factor by cellular signaling.

23. The apparatus of claim 20, wherein the at least one memory and the computer program code are configured to, with the at least one processor, cause the apparatus to receive scheduling information from a base station.

* * * * *